(12) United States Patent
Steed et al.

(10) Patent No.: US 6,460,664 B1
(45) Date of Patent: Oct. 8, 2002

(54) INDEPENDENTLY TUNABLE VARIABLE BLEED ORIFICE

(75) Inventors: David L. Steed, Perrysburg, OH (US); Michael L. Zebolsky, Tecumseh, MI (US); Dean R. Dodge, Saline, MI (US)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/575,900

(22) Filed: May 22, 2000

(51) Int. Cl.⁷ .............................................. F16F 9/348
(52) U.S. Cl. ............................ 188/322.15; 188/282.1
(58) Field of Search ........................ 188/322.15, 282.1

(56) References Cited

U.S. PATENT DOCUMENTS

| | | |
|---|---|---|
| 3,029,903 A | 4/1962 | Wasdell |
| 3,199,636 A | 8/1965 | Bourcier de Carbon |
| 3,365,033 A | 1/1968 | Willich |
| 4,588,053 A | 5/1986 | Foster |
| 4,610,332 A | 9/1986 | Mourray |
| 4,809,828 A | 3/1989 | Nakazato |
| 4,872,537 A | 10/1989 | Warner |
| 4,895,229 A | 1/1990 | Kato |
| 4,953,671 A | 9/1990 | Imaizumi |
| 4,964,493 A | 10/1990 | Yamaura et al. |
| 4,972,929 A | 11/1990 | Ivers et al. |
| 5,018,608 A * | 5/1991 | Imaizumi ................ 188/322.15 |
| 5,042,624 A | 8/1991 | Furuya et al. |
| 5,064,032 A | 11/1991 | Ashiba |
| 5,072,812 A | 12/1991 | Imaizumi |
| 5,150,775 A | 9/1992 | Charles et al. |
| 5,242,038 A | 9/1993 | Yamaoka |
| 5,248,014 A | 9/1993 | Ashiba |
| 5,259,294 A | 11/1993 | May |
| 5,293,971 A | 3/1994 | Kanari et al. |
| 5,316,113 A | 5/1994 | Yamaoka |
| 5,330,132 A | 7/1994 | Lucienne et al. |
| 5,404,973 A | 4/1995 | Katoh et al. |
| 5,413,195 A | 5/1995 | Murakami |
| 5,425,398 A | 6/1995 | Moradmand et al. |
| 5,497,862 A | 3/1996 | Hoya ..................... 188/322.15 |

FOREIGN PATENT DOCUMENTS

GB  2225409  *  5/1900  ............ 188/322.15

* cited by examiner

Primary Examiner—Matthew C. Graham
(74) Attorney, Agent, or Firm—Harness, Dickey & Pierce, PLC (57) ABSTRACT

A shock absorber includes a valve assembly with a low speed valving system and a high speed valving system. Both systems control fluid flow through the respective valve assembly for fluid flow in the same direction. The low speed valving system is independently tunable in order to provide low speed damping to improve both the vehicle control and handling. The independent tuning of the low speed valving system allows the optimization of the low speed valving system in relation to the high speed valving system as well as the independent tuning of the high speed valving system in relation to the low speed valving system. The independent tuning of the two systems allow the achievement of a smooth transition between the two systems. The dual valving systems can be incorporated into the piston for a compression stroke, be incorporated into the piston for an extension stroke, or two dual valving systems can be incorporated into the piston for compression and extension strokes.

8 Claims, 5 Drawing Sheets

INDEPENDENTLY TUNABLE VARIABLE BLEED ORIFICE

FIELD OF THE INVENTION

The present invention relates generally to automotive dampers or shock absorbers which receive mechanical shock. More particularly, the present invention relates to a unique hydraulic valve assembly which allows greater tunability of the shock absorber, especially in the mode of low hydraulic fluid flow.

BACKGROUND OF THE INVENTION

Shock absorbers are used in conjunction with automotive suspension systems to absorb unwanted vibrations which occur during driving. To absorb these unwanted vibrations, shock absorbers are generally connected between the sprung portion (body) and the unsprung portion (wheels) of the automobile. A piston is located within a working chamber defined by a pressure tube of the shock absorber, with the piston being connected to the sprung portion of the automobile through a piston rod. The pressure tube is connected to the unsprung portion of the automobile by one of the methods known in the art. Because the piston is able, through valving, to limit the flow of damping fluid between opposite sides of the piston, when the shock absorber is compressed or extended, the shock absorber is able to produce a damping force which damps the unwanted vibration which would otherwise be transmitted from the unsprung portion to the sprung portion of the automobile. In a dual tube shock absorber, a fluid reservoir is defined between the pressure tube and the reserve tube. When a full displacement piston valving system is used, the fluid reservoir is in direct communication with the lower portion of the working chamber defined by the pressure tube (the area below the piston). All damping forces produced by the shock absorber are the result of piston valving when a full displacement valving system is used. The greater the degree to which the flow of fluid within the shock absorber is restricted by the piston, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant for the main springs of the vehicle as well as the spring constant for the seat and tires and the damping coefficient of the shock absorber. For optimum ride comfort, a relatively low damping force or a soft ride is preferred.

Vehicle handling is related to the variation in the vehicle's attitude (i.e., roll, pitch and yaw). For optimum vehicle handling, relatively large damping forces, or a firm ride, are required to avoid excessively rapid variations in the vehicle's attitude during cornering, acceleration and deceleration.

Finally, road holding ability is generally a function of the amount of contact between the tires and the ground. To optimize road handling ability, large damping forces, or a firm ride, are required when driving on irregular surfaces to prevent loss of contact between the wheel and the ground for excessive periods of time.

Various types of shock absorbers have been developed to generate the desired damping forces in relation to the various vehicle performance characteristics. Shock absorbers have been developed to provide different damping characteristics depending on the speed or acceleration of the piston within the pressure tube. Because of the exponential relation between pressure drop and flow rate, it is a difficult task to obtain a damping force at relatively low piston velocities, particularly at velocities near zero. Low speed damping force is important to vehicle handling since most vehicle handling events are controlled by low speed vehicle body velocities.

Various prior art systems for tuning shock absorbers during low speed movement of the piston create a fixed low speed bleed orifice which provides a bleed passage which is always open across the piston. This bleed orifice can be created by utilizing orifice notches positioned either on the flexible disc adjacent to the sealing land or by utilizing orifice notches directly in the sealing land itself. The limitations of these designs is that because the orifice is constant in cross-sectional area, the created damping force is not a function of the internal pressures of the shock absorber. In order to obtain the low speed control utilizing these open orifice notches, the orifice notches have to be small enough to create a restriction at relatively low velocities. When this is accomplished, the low speed fluid circuit of the valving system will operate over a very small range of velocity. Therefore, the secondary or high-speed stage valving is activated at a lower velocity than is desired. Activation of the secondary valving at relatively low velocities creates harshness because of the shape of the fixed orifice bleed circuit force velocity characteristic is totally different in configuration than the shape of the high-speed circuit.

Prior art attempts at overcoming the problems of fixed orifice bleed valving and thus eliminate harshness during low speed piston movements have included the incorporation of a variable orifice bleed valving circuit. As the velocity of the piston increases, the flow area of the variable orifice would also increase in order to smooth the transition to the secondary valving. These prior art variable orifice bleed valving circuits are typically located at the outer periphery of the flexible valve disc and thus they are dependent on the diameter of the disc to determine the rate at which the flow area increases. As the diameter of the flexible disc increases, it becomes more difficult to control the rate at which the flow area of the orifice increases. Since the flow area is increased by the deflection of the variable orifice bleed disc, a small deflection in a large diameter variable orifice bleed disc provides a rapid increase in the flow area of the bleed orifice. This rapid increase in the flow area complicates the tuning between the low speed valving circuit and the secondary or high-speed valving circuit.

Still other prior art systems have developed variable orifice bleed valving circuits which are integrated with the mid/high speed valving systems. The integration of the low speed circuit with the mid/high speed circuit creates a system where the tuning of the low speed circuit affects the mid/high speed circuit and the tuning of the mid/high speed circuit affects the low speed circuit.

The continued development of shock absorbers includes the development of a valving system which can provide a smooth transition between a low speed valving circuit and the secondary valving or high speed valving circuit. The smooth transition between these two circuits helps to reduce and/or eliminate any harshness during the transition. In addition to the smooth transition, the development of these systems has also been directed towards the separation of these two circuits in order to be able to independently tune each of these circuits.

SUMMARY OF THE INVENTION

The present invention provides the art with a method for independently tuning damping forces at low piston velocities in order to improve the handling characteristics of the vehicle without creating harshness. The present invention provides a low speed variable orifice bleed circuit which is separate from the mid/high speed circuit or the secondary valving system. The secondary valving system of the present invention includes a first plurality of discs secured to the piston to close the mid/high speed extension and compression fluid passages extending through the piston. The first plurality of discs deflect due to a pressure differential to open the mid/high speed extension or compression fluid passages during the second stage valving. The low speed variable orifice bleed circuit of the present invention includes a second plurality of discs secured to the piston but separate from the first plurality of discs. The second plurality of discs close the low speed extension and compression fluid passages extending through the piston. The second plurality of discs also deflect due to a pressure differential to open the low speed extension or compression fluid passages during the initial stage valving. The separation of these two valving systems allows the designer to separately optimize the tuning of each valving system to optimize the damping forces created by the shock absorber during both an extension stroke and a compression stroke of the shock absorber and thus improve the vehicle handling without creating harshness.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
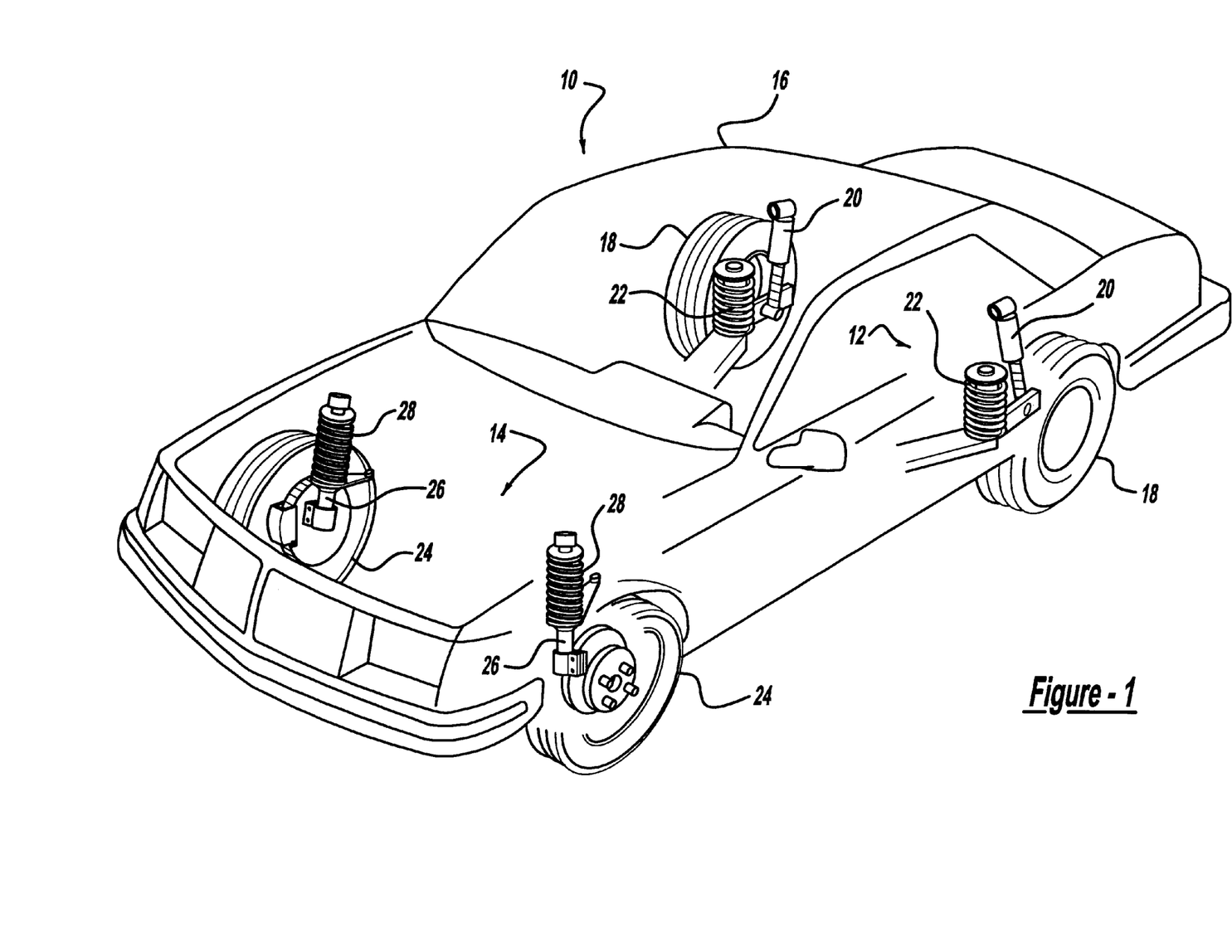
FIG. 1 is an illustration of an automobile using the variable bleed orifice in accordance with the present invention.

Referring now to the drawings in which like reference numerals designate like or corresponding parts throughout the several views, there is shown in FIG. 1 a vehicle incorporating a suspension system having the independent variable bleed orifice in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems. Further, the term "shock absorber" as used herein is meant to refer to dampers in general and thus will include McPherson struts.

Figure 2:
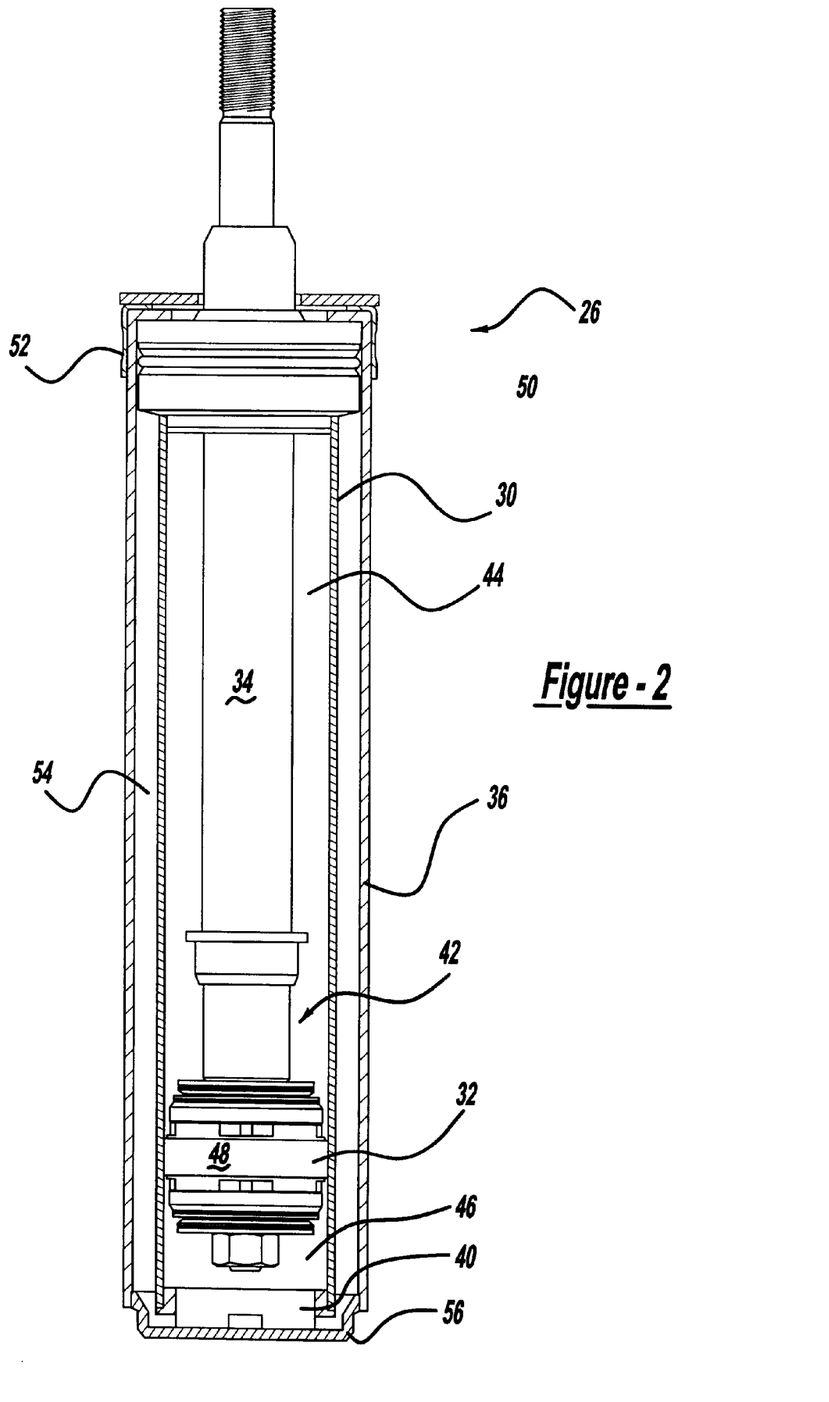
FIG. 2 is a side view, partially in cross-section of a shock absorber incorporating the independent variable bleed orifice in accordance with the present invention.

Referring now to FIG. 2, shock absorber 26 is shown in greater detail. While FIG. 2 shows only shock absorber 26, it is to be understood that shock absorber 20 also includes the variable bleed orifice valving in accordance with the present invention which is described below for shock absorber 26. Shock absorber 20 differs from shock absorber 26 in the away in which it is adapted to be connected to the sprung and unsprung portions of vehicle 10. Shock absorber 26 comprises a pressure tube 30, a piston assembly 32, a piston rod 34, a reservoir tube 36 and a base fitting 40.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of both pressure tube 30 and reservoir tube 36. A sealing system 52 seals the interface between upper end cap 50, pressure tube 30, reservoir tube 36 and piston rod 34. The end of piston rod 34 opposite to piston assembly 32 is adapted, in the preferred embodiment, to be secured to the sprung portion of vehicle 10. Valving in piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 than the amount of fluid displaced in lower working chamber 46. This difference in the amount of fluid displaced is known as the "rod volume" and it flows through base fitting 40. While shock absorber 26 is being illustrated as a dual tube shock absorber having base fitting 40, it is within the scope of the present invention to utilize piston assembly 32 in a mono-tube designed shock absorber if desired.

Reservoir tube 36 surrounds pressure tube 30 to define a reserve chamber 54 located between the tubes. The bottom end of reservoir tube 36 is closed by an end cap 56 which is adapted, in the preferred embodiment, to be connected to the unsprung portion of vehicle 10. The upper end of reservoir tube 36 is attached to upper end cap 50. Base fitting 40 is disposed between lower working chamber 46 and reserve chamber 54 to allow the flow of fluid between the two chambers. When shock absorber 26 extends in length (rebound), an additional volume of fluid is needed in lower working chamber 46 due to the "rod volume" concept. Thus, fluid will flow from reserve chamber 54 to lower working chamber 46 through base fitting 40. When shock absorber 26 compresses in length (compression), an excess volume of fluid must be removed from lower working chamber 46 due to the "rod volume" concept. Thus, fluid will flow from lower working chamber 46 to reserve chamber 54 through base fitting 40.

The present invention is directed to a unique full flow piston assembly 32 which includes variable bleed orifice valving for both rebound and compression strokes which is independent of the mid/high speed valving. Piston assembly 32 provides an independent tunable smooth transition between the low speed valving and the mid/high speed valving in both a compression movement and a rebound movement of shock absorber 26. The damping characteristics for both rebound (extension) and compression for shock absorber 26 are determined by piston assembly 32 thus eliminating the need for a base valve assembly.

Figure 3:
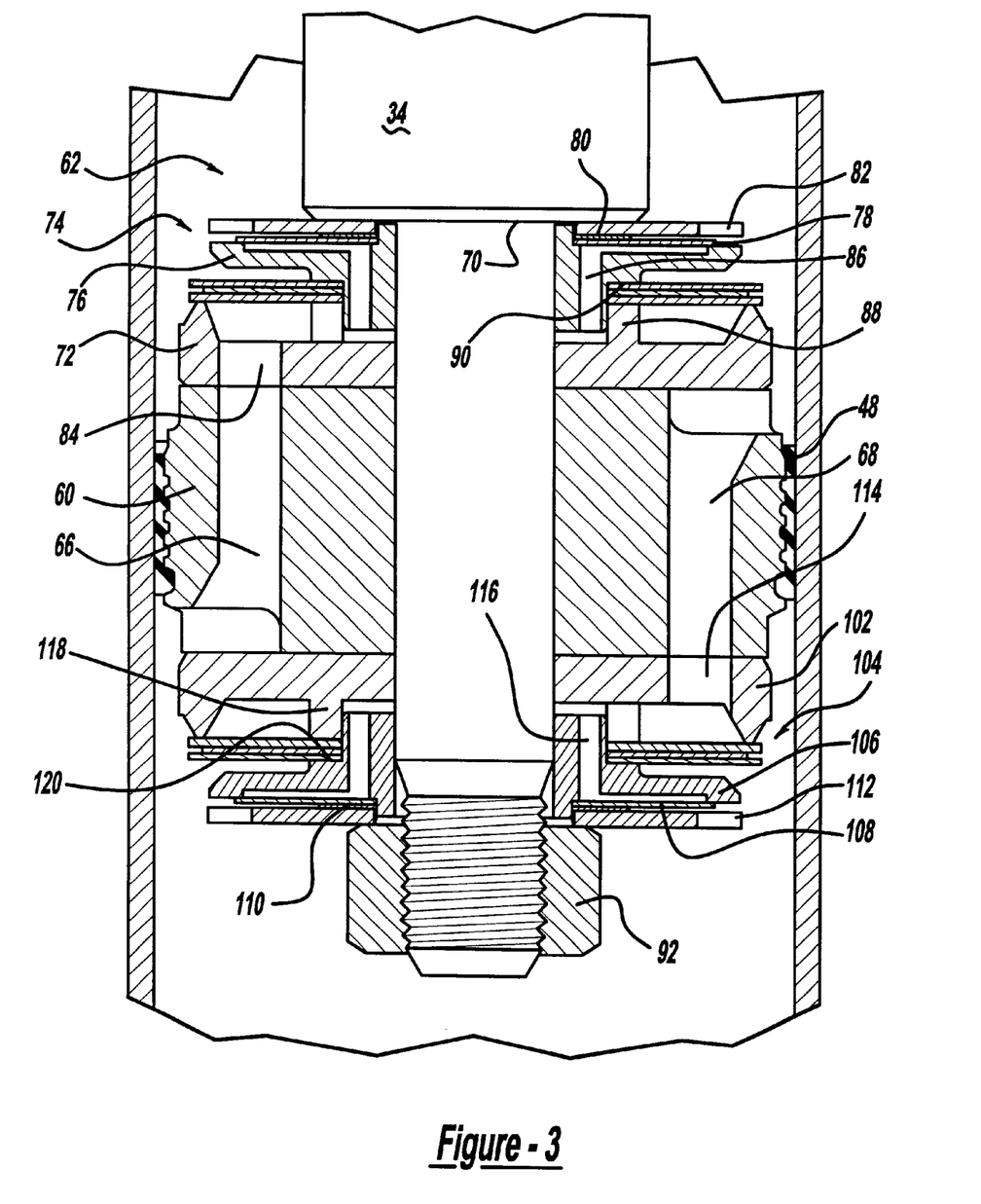
FIG. 3 is an enlarged side elevational view, partially in cross-section, of the piston assembly for the shock absorber shown in FIG. 2.
Figure 4:
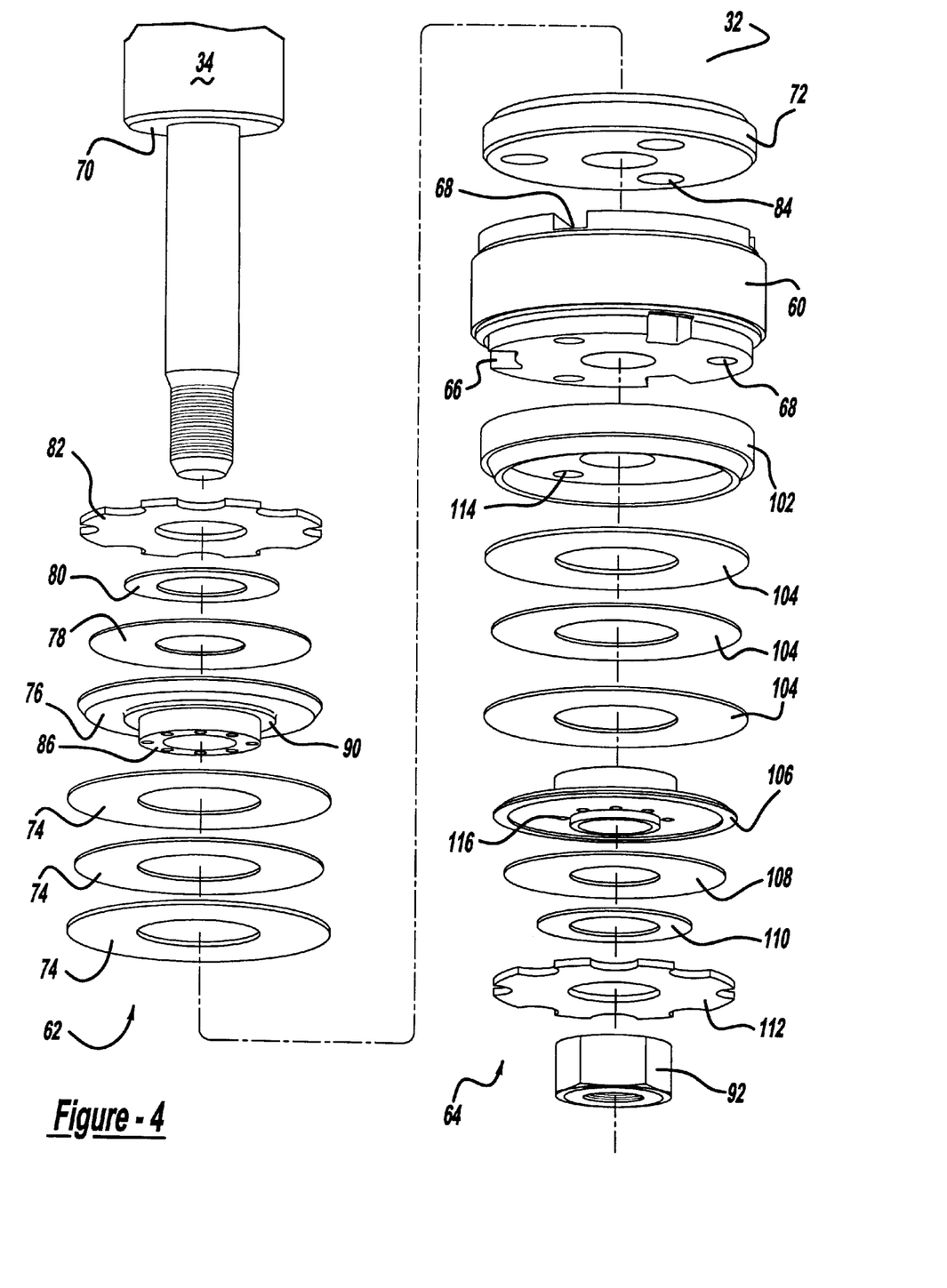
FIG. 4 is an exposed perspective view of the piston assembly shown in FIG. 3.

Referring now to FIGS. 3 and 4, piston assembly 32 comprises a piston 60, a compression valve assembly 62 and a rebound valve assembly 64. Piston 60 is secured to piston rod 34 and it defines a plurality of compression fluid passages 66 and a plurality of rebound fluid passages 68. Compression valve assembly 62 is disposed on the upper side of piston 60 adjacent a shoulder 70 defined by piston rod 34. Compression valve assembly 62 comprises a piston plate 72, a plurality of mid/high speed valve discs 74, a bleed valve body 76, a bleed valve disc 78, a bleed washer 80, and a bleed check plate 82. Piston plate 72 is disposed adjacent piston 60 and it defines a plurality of compression passages 84 that are in registry with the plurality of compression fluid passages 66 and 84. Bleed valve body 76 defines a plurality of compression bleed passages 86 which are also in fluid communication with the plurality of compression fluid passages 66.

Valve discs 74 are sandwiched between a shoulder 88 on piston plate 72 and an annular surface 90 on bleed valve body 76 to close the plurality of compression passages 84 and thus the plurality of compression fluid passages 66. Bleed valve disc 78 is located adjacent bleed valve body 76 to close the plurality of bleed passages 86. Bleed washer 80 is disposed between bleed valve disc 78 and bleed check plate 82. Bleed check plate 82 is located adjacent shoulder 70 on piston rod 34. A retaining nut 92 is assembled to the end of piston rod 34. Nut 92 maintains the assembly of compression valve assembly 62, piston 60 and rebound valve assembly 64 as shown in FIG. 3.

During a compression stroke for shock absorber 26, fluid pressure increases in lower working chamber 46 and fluid pressure decreases in upper working chamber 44. The increase in fluid pressure in lower working chamber 46 is transferred through passages 66 and 84 to exert a load on mid/high speed discs 74 and through passages 86 to exert a load on bleed valve disc 78. Bleed valve disc 78 is designed to deflect at a lower load than discs 74 and thus will deflect first to allow fluid flow between lower working chamber 46 and upper working chamber 44 during low speed movements of piston 60 when relatively low pressure differentials across disc 78 exist. As the pressure differentials across disc 78 continue to increase, disc 78 will deflect an additional amount to increase the fluid flow between lower working chamber 46 and upper working chamber 44. The amount of deflection and thus the metering for the fluid flow is controlled by the thickness of bleed washer 80. Eventually, as the speed of movement of piston 60 increases, the bleed flow of fluid will reach a saturation point due to bleed washer 80 and the pressure differential across mid/high speed valve discs 74 (which is the same pressure differential across disc 78) will increase and exert a sufficient load against valve discs 74 to cause deflection of valve discs 74 to allow additional flow of fluid between lower working chamber 46 and upper working chamber 44. The transition between the fluid flow past disc 78 and the fluid flow past discs 74 can be controlled by the design of bleed valve body 76, bleed valve disc 78, bleed washer 80 and bleed check plate 82. Factors that will affect the shape of the transition curve include, but are not limited to, the diameter of bleed valve body 76, the size of passages 86, the thickness, size and stiffness of bleed valve disc 78, the diameter and thickness of bleed washer 80 and the size of bleed check plate 82. All of the factors which control the shape of the transition curve are independent of the design for piston plate 72 and the plurality of mid/high speed valve discs 74. Thus, the tuning of the transition between low speed valving and mid/high speed valving is independent from the mid/high speed valving thus allowing the independent tuning of both valving systems. Even though bleed valve body 76 interfaces between the low speed valving and the mid/high speed valving, the independence between these two valving systems is maintained since the low speed valving system is affected by the design of the upper surface of bleed valve body 76 while the mid/high speed valving system is affected by the design of the lower surface of bleed valve body 76.

Rebound valve assembly 64 is disposed on the lower side of piston 60 adjacent retaining nut 92. Rebound valve assembly 64 comprises a second piston plate 102, a second plurality of mid/high speed valve discs 104, a second bleed valve body 106, a second bleed valve disk 108, a second bleed washer 110, and a second bleed check plate 112. Piston plate 102 is disposed adjacent piston 60 and it defines a plurality of rebound passages 114 that are in registry with the plurality of rebound fluid passages 68. Bleed valve body 106 defines a plurality of rebound bleed passages 116 which are also in fluid communication with the plurality of rebound fluid passages 68 and 114.

Valve discs 104 are sandwiched between a shoulder 118 on piston plate 102 and an annular surface 120 on bleed valve body 106 to close the plurality of rebound passages 114 and thus the plurality of rebound fluid passages 68. Bleed valve disc 108 is located adjacent bleed valve body 106 to close the plurality of bleed passages 116. Bleed washer 110 is disposed between bleed valve disc 108 and bleed check plate 112. Bleed check plate 112 is located adjacent retaining nut 92 which is assembled to the end of piston rod 34. Nut 92 maintains the assembly of compression valve assembly 62, piston 60 and rebound valve assembly 64 as shown in FIG. 3.

During a rebound stroke for shock absorber 26, fluid pressure decreases in lower working chamber 46 and fluid pressure increases in upper working chamber 44. The increase in fluid pressure in upper working chamber 44 is transferred through passages 68 and 114 to exert a load on mid/high speed discs 104 and through passages 116 to exert a load on bleed valve disc 108. Bleed valve disc 108 is designed to deflect at a lower load than discs 104 and thus will deflect first to allow fluid flow between upper working chamber 44 and lower working chamber 46 during low speed movements of piston 60 when relatively low pressure differentials across disc 108 exist. As the pressure differentials across disc 108 continues to increase, disc 108 will deflect an additional amount to increase the fluid flow between upper working chamber 44 and lower working chamber 46. The amount of deflection and thus the metering for the fluid flow is controlled by the thickness of bleed washer 110. Eventually, as the speed of movement of piston 60 increases, the bleed flow of fluid will reach a saturation point due to bleed washer 110 and the pressure differential across mid/high speed valve discs 104 (which is the same pressure differential across disc 108) will increase and exert a sufficient load against valve discs 104 to cause deflection of valve discs 104 to allow additional flow of fluid between upper working chamber 44 and lower working chamber 46. The transition between the fluid flow past disc 108 and the fluid flow past discs 104 can be controlled by the design of bleed valve body 106, bleed valve disc 108, bleed washer 110 and bleed check plate 112. Factors that will affect the shape of the transition curve include but are not limited to the diameter of bleed valve body 106, the size of passages 116, the thickness, size and stiffness of bleed valve disc 108, the diameter and thickness of bleed washer 110 and the size of bleed check plate 112. All of the factors which control the shape of the transition curve are independent of the design for piston plate 102 and the plurality of mid/high speed valve discs 104. Thus, the tuning of the transition between low speed valving and mid/high speed valving is independent from the mid/high speed valving thus allowing the independent tuning of both valving systems. Even though bleed valve body 106 interfaces between the low speed valving and the mid/high speed valving, the independence between these two valving systems is maintained since the low speed valving system is affected by the design of the lower surface of bleed valve body 106 while the mid/high speed valving system is affected by the design of the upper surface of bleed valve body 106.

Figure 5:
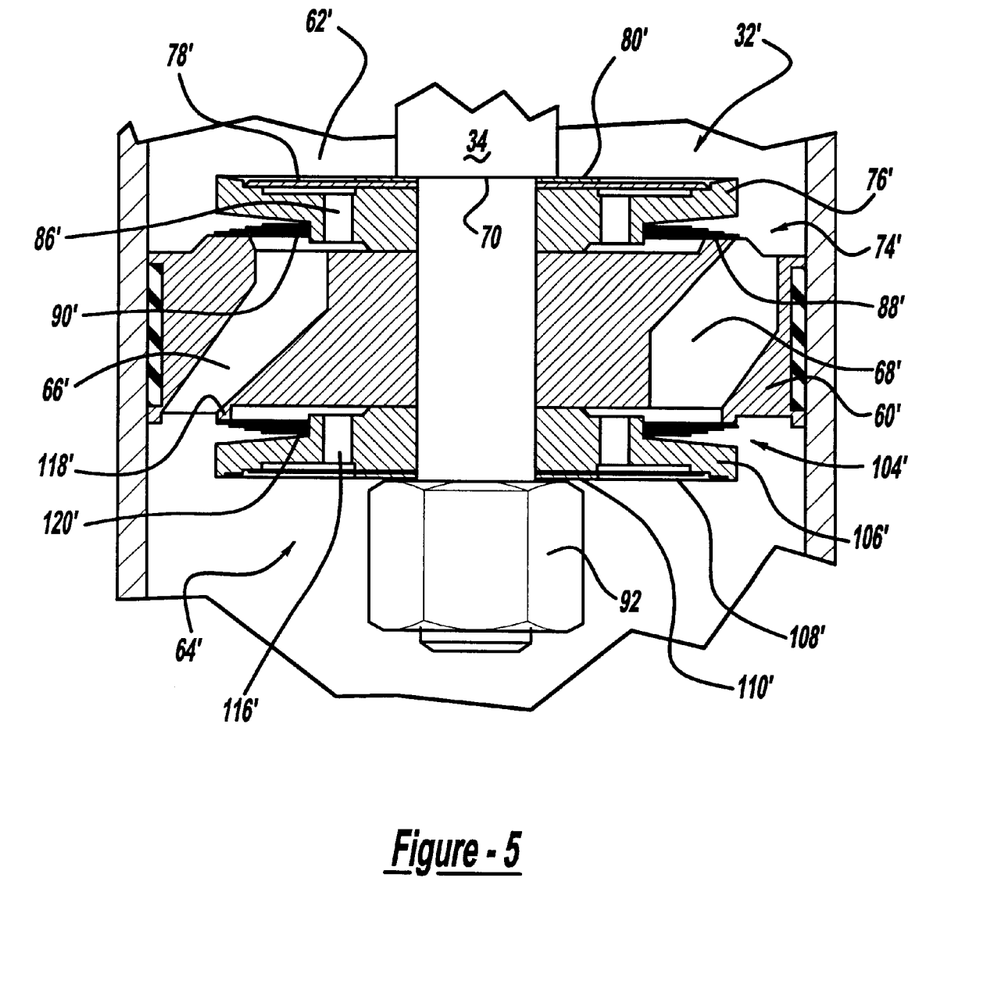
FIG. 5 is an enlarged side elevational view, partially in cross-section, of a piston assembly incorporating an independent variable bleed orifice in accordance with another embodiment of the present invention.

Referring now to FIG. 5, a piston assembly 32' in accordance with another embodiment of the present invention is disclosed. Piston assembly 32' comprises a piston 60', a compression valve assembly 62' and a rebound valve assembly 64'. Piston 60' is secured to piston rod 34 and it defines a plurality of compression fluid passages 66' and a plurality of rebound fluid passages 68'.

Compression valve assembly 62' is disposed on the upper side of piston 60' adjacent shoulder 70 defined by piston rod 34. Compression valve assembly 62' comprises a plurality of mid/high speed valve discs 74', a bleed valve body 76', a bleed valve disc 78' and a bleed washer 80'.

Valve discs 74' are sandwiched between a shoulder 88' on piston 60' and an annular surface 90' on bleed valve body 76' to close the plurality of compression fluid passages 66'. Bleed valve body 76' defines a plurality of compression bleed passages 86' which are in communication with the plurality of compression fluid passages 66'. Bleed valve disc 78' is located adjacent bleed valve body 76' and adjacent bleed washer 80' to close the plurality of bleed passages 86' and 66'. Retaining nut 92 maintains the assembly of compression valve assembly 62', piston 60' and rebound valve assembly 64' as shown in FIG. 6.

During a compression stroke for shock absorber 20, the operation and function for compression valve assembly 62' is the same as that described above for compression valve assembly 62.

Rebound valve assembly 64' is disposed on the lower side of piston 60' adjacent retaining nut 92. Rebound valve assembly 64' comprises a plurality of mid/high speed valve discs 104', a bleed valve body 106', a bleed valve disc 108' and a bleed washer 110'.

Valve discs 104' are sandwiched between a shoulder 1 18' on piston 60' and an annular surface 120' on bleed valve body 106' to close the plurality of rebound fluid passages 68'. Bleed valve body 106' defines a plurality of rebound bleed passages 116' which are in communication with the plurality of rebound fluid passages 68'. Bleed valve disc 108' is located adjacent bleed valve body 106' and adjacent bleed washer 110' to close the plurality of bleed passages 116' and 68'. Retaining nut 92 maintains the assembly of compression valve assembly 62', piston 60' and rebound valve assembly 64' as shown in FIG. 6.

During a rebound stroke for shock absorber 20, the operation and function for rebound valve assembly 64' is the same as that described above for rebound valve assembly 64.

While the above detailed description describes the preferred embodiment of the present invention, it should be understood that the present invention is susceptible to modification, variation and alteration without deviating from the scope and fair meaning of the subjoined claims.

What is claimed is:

1. A damper comprising:
 a pressure tube forming a working chamber;
 a piston assembly disposed within said working chamber, said piston assembly dividing said working chamber into an upper working chamber and a lower working chamber, said piston assembly comprising:
 a piston defining a compression fluid passage extending between said upper and lower working chambers and a rebound fluid passage extending between said upper and lower working chambers;
 a compression valve assembly attached to said piston for controlling fluid flow through said compression fluid passage, said compression valve assembly always being in continuous fluid communication with both of said upper and lower working chambers;
 a rebound valve assembly attached to said piston for controlling fluid flow through said rebound fluid passage, said rebound valve assembly always being in continuous fluid communication with both of said upper and lower working chambers;
 a first bleed valve assembly attached to said piston for controlling fluid flow between said upper working chamber and said lower working chamber, said first bleed valve assembly being independent from said compression valve assembly and said rebound valve assembly, said first bleed valve assembly including a first metering device for limiting fluid flow through said first bleed valve assembly for tuning said damper, said first metering device always being in continuous fluid communication with both of said upper and lower working chambers; and
 a second bleed valve assembly attached to said piston for controlling fluid flow between said upper working chamber and said lower working chamber, said second bleed valve assembly being independent from said compression valve assembly and said rebound valve assembly, said second bleed valve assembly including a second metering device for limiting the fluid flow through said second valve assembly for tuning said damper, said second metering device always being in continuous fluid communication with both of said upper and lower working chambers.

2. The damper according to claim 1, wherein said first metering device is a bleed washer.

3. The damper according to claim 2, wherein said first bleed valve assembly includes a bleed valve disc, deflection of said bleed valve disc being controlled by said bleed washer.

4. The damper according to claim 1, wherein said first metering device is a bleed valve disc for limiting fluid flow through said first bleed valve assembly.

5. The damper according to claim 4, wherein said bleed valve disc defines a notch, said notch being sized to limit fluid flow through said first bleed valve assembly.

6. The damper according to claim 1, wherein said first metering device is a first bleed washer and said second metering device is a second bleed washer.

7. The damper according to claim 6, wherein said first bleed valve assembly includes a first bleed valve disc and said second bleed valve assembly includes a second bleed valve disc, deflection of said first bleed valve disc being controlled by said first bleed washer, deflection of said second bleed valve disc being controlled by said second bleed washer.

8. The damper according to claim 1, further comprising a reservoir tube disposed around said pressure tube, said reservoir tube forming a reserve chamber between said pressure tube and said reservoir tube.

* * * * *